Feb. 11, 1958
J. C. BERGERON, SR
2,822,658
NUT HARVESTER
Filed May 3, 1956
2 Sheets-Sheet 2
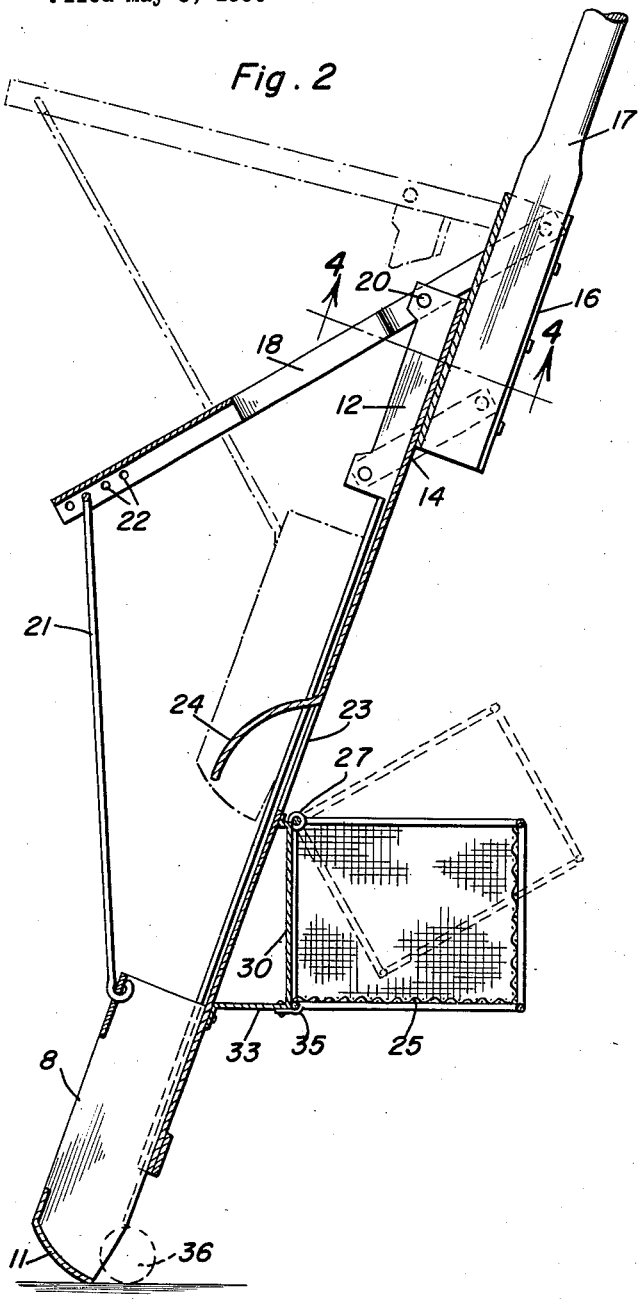
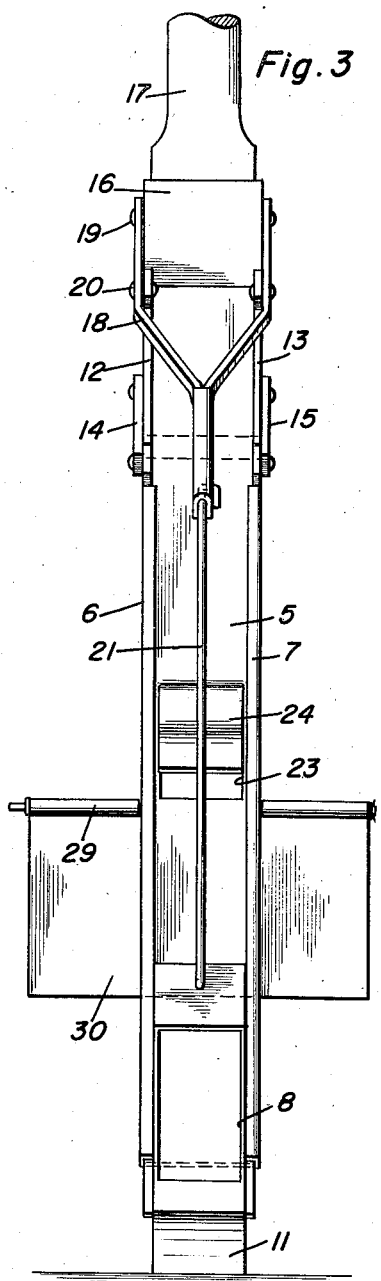
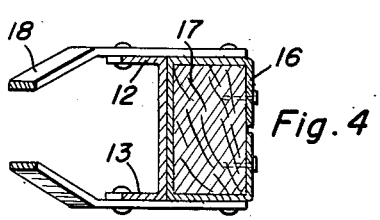
Joseph C. Bergeron
INVENTOR.
BY 500
United States Patent Office 2,822,658
Patented Feb. 11, 1958

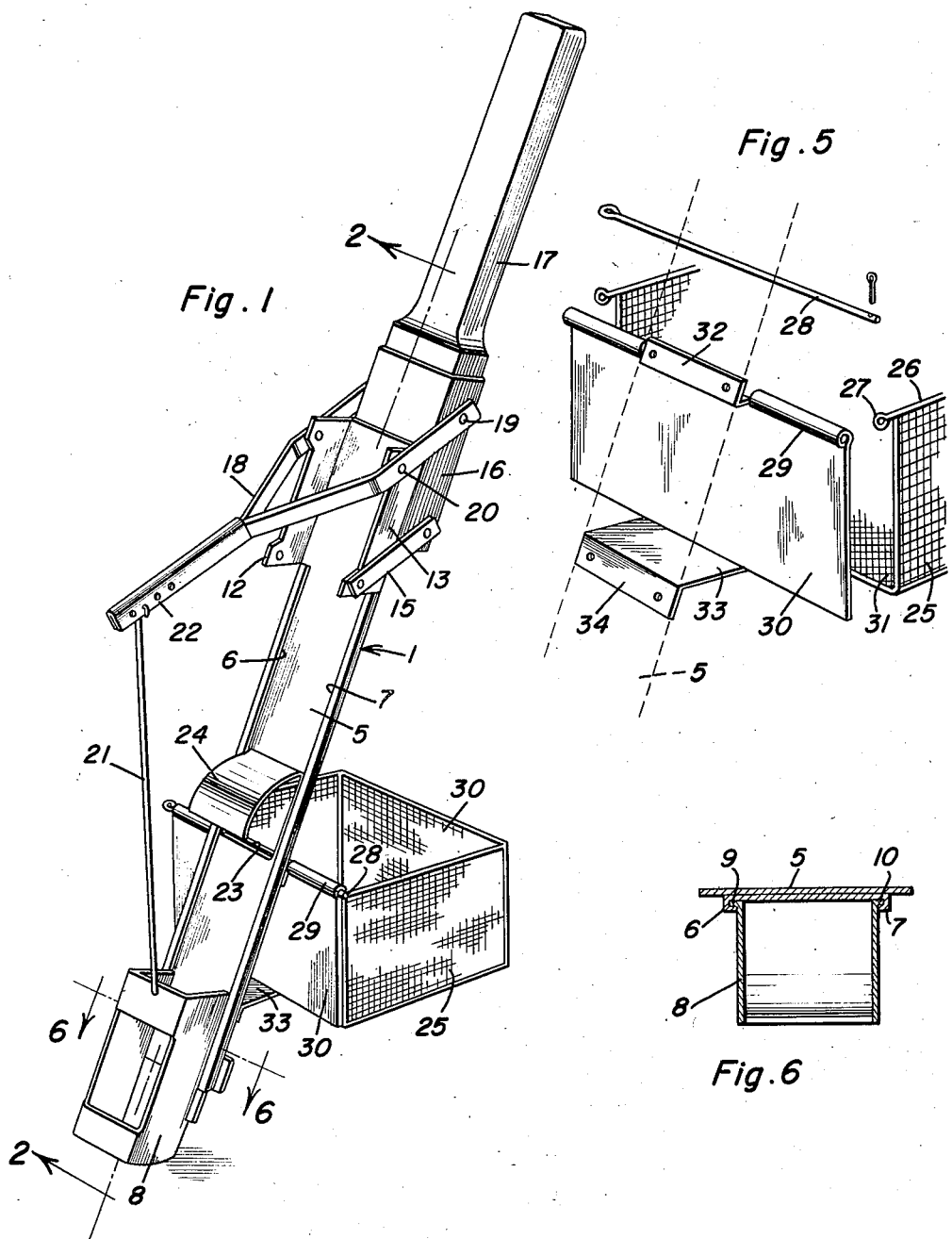

2,822,658

NUT HARVESTER

Joseph C. Bergeron, Sr., Livonia, La.

Application May 3, 1956, Serial No. 582,411

3 Claims. (Cl. 56—328)

The present invention relates to new and useful improvements in devices for harvesting pecans or other nuts or for gathering other relatively small objects from the ground.

An important object of the invention is to provide a hand operated nut gathering device by means of which a person standing in erect position may gather nuts from the ground and the nuts will be deposited into a basket supported on the device, thereby avoiding the usual tiring and tedious work of stopping or kneeling to gather the nuts.

Another object is to provide a handle having a vertically slidable nut gathering scoop connected thereto and actuated by a depressing movement of the handle to pickup and elevate the nuts and subsequently deposit the same into a basket supported adjacent the scoop.

A further object is to provide a pivoted basket into the top of which the nuts are deposited and having an open front which gravitates against a stationary closure to retain the nuts in the basket while being filled and the basket being emptied by an upward swinging movement thereof away from the plate.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a vertical sectional view taken on a line 2—2 of Figure 1;

Figure 3 is a front elevational view;

Figure 4 is an enlarged transverse sectional view taken on a line 4—4 of Figure 2;

Figure 5 is an enlarged fragmentary perspective view of the stationary closure and pivotal mounting for the basket, and Figure 6 is an enlarged transverse sectional view taken on a line 6—6 of Figure 1.

Referring now to the drawings in detail, wherein for the purpose of illustration, I have disclosed a preferred embodiment of my invention, the numeral 1 designates a nut gathering mechanism generally and which comprises a rectangular shaped elevator plate 5 having opposed channels 6 and 7 at its side edges on its front surface. A scoop 8 is formed with outwardly projecting flanges 9 and 10 at its side edges for sliding in the channels 6 and 7. The rear surface of the scoop is open and faces against the front surface of the elevator plate and the lower end of the scoop projects below the lower end of the elevator plate and is formed with a rearwardly facing curved scooping blade 11.

The upper portion of the elevator plate is formed at its side edges with forwardly projecting flanges 12 and 13 and to the lower portion of which a pair of links 14 and 15 are pivoted at one end and with the other ends of the links pivoted to the sides of a metal socket 16 of rectangular shape in cross-section and positioned behind the elevator plate. A wooden handle 17 has its lower end secured in said socket.

A Y-shaped yoke 18 straddles the socket and is pivoted at the sides of the latter by pins or the like 19 and the yoke extends forwardly of the socket and is also pivotally connected at its side portions to the upper portion of the flanges 12 and 13 by pins or the like 20 above the links 14 and 15. A vertical rod 21 connects the front end of the yoke to the scoop 8 and the upper end of the rod is adjustable in a row of openings 22 in the yoke to regulate the raising movement of the scoop by a corresponding movement of the yoke.

An opening 23 is formed in the elevator plate 5 above the scoop and a deflector plate 24 extends forwardly and downwardly from the elevator plate over the opening.

A wire basket 25 is constructed at its top with a wire frame 26 having rearwardly projecting eyes 27 which are pivoted on the end portions of a pin 28. The pin is supported in a rolled sleeve 29 at the upper edge of a closure plate 30 to close the open rear portion 31 of the basket.

The closure plate 30 is secured to the rear surface of elevator plate 5 by an upper attaching flange 32 and a brace web 33 is formed at the lower edge of the closure plate and includes a lower attaching flange 34 for also attaching to the elevator plate to support the closure plate at an angle to the elevator plate. The basket swings forwardly by gravity to close the open portion 31 thereof against the stationary closure plate 30. The basket is secured in its closed position by a resilient catch 35.

In the operation of the device the handle is held in a downwardly inclined position, as shown in Figure 2, and with the lower end of the scoop 8 positioned close to the ground to scoop a nut 36 therein and a downward pressure on the handle 17 slides the scoop upwardly on the elevator plate with the nut held in the scoop and when the lower end of the elevator plate strikes the ground the continued downward pressure on the handle will swing the yoke 18 upwardly and continue to raise the scoop into the position shown by dotted lines in Figure 2 until the opening 23 in the elevator plate 5 is reached, whereupon deflector 24 will deposit the nut into the basket 25. Upon releasing the downward pressure on the handle the elevator plate 5 and scoop 8 will slide downwardly by gravity to position the scoop below the elevator plate for repeating the gathering operation.

When the basket has become filled the contents thereof may be emptied into a suitable container by swinging the basket upwardly away from the stationary closure 30, as shown by dotted lines in Figure 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gathering device comprising a handle, an elevator slidably carried by the handle and including a vertical plate having an opening therein and a scoop slidable on the plate, said scoop projecting below the lower end of the plate and adapted to scoop up an object from the ground, means connecting the plate and scoop to the handle for raising the former upon a relative depressing movement of the handle to deliver the object to the opening, a receptacle supported on the plate into which the object is deposited, and a deflector member on the vertical plate extending over said opening to deflect the object out of the scoop and into the opening.

2. A gathering device comprising a handle, an elongated elevator plate having an opening therein, means connecting the plate to the handle for raising the former by a depressing movement of the latter, a scoop slidably mounted on the elevator plate and having a scooping lower end projecting below the plate to engage and pick up an object on the ground, means connecting the scoop to the handle for actuation by the latter to deliver an object to the opening, a receptacle carried by the plate to receive the object delivered to the opening, and a deflector plate on the elevator plate extending over said opening to deflect the object out of the scoop and into the opening.

3. A gathering device comprising a handle, an elongated elevator plate, a scoop, interlocking means slidably connecting the scoop to the plate, said scoop having a lower scooping end projecting below the plate to scoop up an object from the ground and to slide the object upwardly on the plate, means connecting the scoop and plate to the handle for raising the scoop and plate by a relatively depressing movement of the handle, and a receptacle supported behind the plate into which the elevated object is deposited, said receptacle including means pivotally connecting the upper portion thereof to the plate for rearward swinging movement away from the plate, said receptacle being open at its top to receive the object and also open at its side adjacent the plate, and a stationary closure carried by the plate against which the open side of the receptacle is closed by gravitation of the receptacle toward the plate.

References Cited in the file of this patent

UNITED STATES PATENTS

| 908,208 | Crawford | Dec. 29, 1908 |
| 2,737,007 | Pickering | Mar. 6, 1956 |